United States Patent

Goupil et al.

(10) Patent No.: US 10,049,511 B2
(45) Date of Patent: Aug. 14, 2018

(54) METHOD AND DEVICE FOR DETECTING OSCILLATORY FAILURES IN AN AUTOMATIC POSITION CONTROL CHAIN OF AN AIRCRAFT CONTROL SURFACE

(71) Applicant: Airbus Operations SAS, Toulouse (FR)

(72) Inventors: Philippe Goupil, Beaupuy (FR); Rémy Dayre, Pibrac (FR); Simone Urbano, Vasto (IT)

(73) Assignee: AIRBUS OPERATIONS SAS, Toulouse (FR)

( * ) Notice: Subject to any disclaimer, the term of this patent is extended or adjusted under 35 U.S.C. 154(b) by 74 days.

(21) Appl. No.: 15/284,989

(22) Filed: Oct. 4, 2016

(65) Prior Publication Data

US 2017/0109946 A1    Apr. 20, 2017

(30) Foreign Application Priority Data

Oct. 14, 2015   (FR) .................................... 15 59755

(51) Int. Cl.
   *B64C 23/02*    (2006.01)
   *G07C 5/08*     (2006.01)
   *B64D 45/00*    (2006.01)
   *G05B 23/02*    (2006.01)
   *B64C 13/50*    (2006.01)

(52) U.S. Cl.
   CPC .......... *G07C 5/0808* (2013.01); *B64C 13/503* (2013.01); *B64D 45/0005* (2013.01); *G05B 23/0235* (2013.01)

(58) Field of Classification Search
   None
   See application file for complete search history.

(56) References Cited

U.S. PATENT DOCUMENTS

| 8,160,770 B2* | 4/2012 | Goupil | ................... B64C 13/50 244/99.11 |
| 2007/0124038 A1* | 5/2007 | Goupil | ............... G05B 23/0254 701/31.1 |

(Continued)

FOREIGN PATENT DOCUMENTS

| EP | 2026158 | 2/2009 |
| FR | 2893911 | 6/2007 |
| FR | 2936067 | 3/2010 |

OTHER PUBLICATIONS

French Search Report, dated Jun. 15, 2016, priority document.

*Primary Examiner* — Mussa A Shaawat
*Assistant Examiner* — Abdhesh K Jha
(74) *Attorney, Agent, or Firm* — Greer, Burns & Crain, Ltd.

(57) ABSTRACT

A detection device comprising a first data processing unit configured to determine a first trend of the control surface control order as a function of time, the first trend being defined according to a reference parameter, a second data processing unit configured to determine at least one second trend of the control surface position value as a function of time, the second trend being also defined according to the reference parameter, and a monitoring unit configured to compare the first and second trends in order to verify the existence of a correlation between these first and second trends so as to detect an oscillatory failure as soon as a loss of correlation between the first and second trends appears, if necessary.

15 Claims, 3 Drawing Sheets

(56) References Cited

U.S. PATENT DOCUMENTS

| | | | |
|---|---|---|---|
| 2009/0048689 A1 | 2/2009 | Pelton et al. | |
| 2009/0138147 A1* | 5/2009 | Grinits | G05D 1/0825 |
| | | | 701/14 |
| 2009/0309574 A1* | 12/2009 | Goupil | G05B 23/0235 |
| | | | 324/76.41 |
| 2011/0004361 A1* | 1/2011 | Goupil | B64C 13/16 |
| | | | 701/3 |
| 2012/0101794 A1* | 4/2012 | Gojny | G05B 23/0254 |
| | | | 703/8 |
| 2013/0325254 A1* | 12/2013 | Goupil | G05B 23/0254 |
| | | | 701/33.9 |
| 2014/0288764 A1* | 9/2014 | Catt | B64C 9/20 |
| | | | 701/31.9 |
| 2014/0372078 A1* | 12/2014 | Gheorghe | G01M 17/00 |
| | | | 702/183 |

* cited by examiner

METHOD AND DEVICE FOR DETECTING OSCILLATORY FAILURES IN AN AUTOMATIC POSITION CONTROL CHAIN OF AN AIRCRAFT CONTROL SURFACE

CROSS-REFERENCES TO RELATED APPLICATIONS

This application claims the benefit of the French patent application No. 1559755 filed on Oct. 14, 2015, the entire disclosures of which are incorporated herein by way of reference.

BACKGROUND OF THE INVENTION

The present invention relates to a method and a device for detecting oscillatory failures in at least one automatic position control chain of an aircraft control surface, as well as a system of electrical flight controls comprising such a detection device.

The present invention applies to an automatic control chain:
  which is intended to automatically control the position of all kinds of aircraft control surface, such as ailerons, spoilers or an elevator, for example;
  which forms part of a system of electrical flight controls of the aircraft; and
  which comprises:
  the control surface which is mobile, and the position of which relative to the aircraft is set by at least one actuator;
  the actuator which sets the position of the control surface, according to at least one actuation order received;
  at least one sensor which measures the actual position of the control surface; and
  a computer which generates a control surface actuation order, transmitted to the actuator, from the measured actual position and a control order computed by the automatic pilot or from the action of the pilot on a control column and on the inertial state of the aircraft.

It is known that such an automatic control chain comprises electronic components which are likely, in failing mode, to generate a spurious signal which can cause the automatically controlled control surface to oscillate. A phenomenon of this type is called "oscillatory failure." Another possible cause of the oscillation is the malfunction or the breakage of a mechanical part of the actuator.

It is also known that, when such an oscillatory failure exhibits a frequency which is located within the bandwidth of the actuator, it has the effect:
  of generating significant loads on the structure of the aircraft, which makes it necessary to reinforce this structure, if a dedicated device does not make it possible to detect this failure;
  of generating loads in case of excitation of one of the fundamental modes of vibration of the aircraft (phenomenon of resonance, aeroelastic coupling);
  of accelerating the fatigue of the structure of the aircraft;
  of accelerating the fatigue of the actuator or actuators used; and
  of reducing the comfort of the passengers of the aircraft.

In practice, the aircraft is designed to support a certain load envelope which is defined by an amplitude/frequency curve. Thus, for example, the appearance of wind gusts will impact the flexible structure of the aircraft and generate loads on this structure but, with the aircraft being designed to withstand these loads, there are no particular actions to be put in place. However, in the case of an oscillatory failure, it may be that the associated loads lie outside the design envelope. Specific monitoring procedures are put in place to rapidly detect these stray oscillations and thus guarantee that the vibrations of the aircraft remain within the predetermined amplitude/frequency envelope. In the absence of these monitoring means, the complete coverage of such oscillatory failures would require structural reinforcements of the aircraft, which would increase the cost of the aircraft.

However, the usual solutions for performing such monitoring procedures exhibit a high dependency in relation:
  to the hardware used;
  to the type of piloting law of the aircraft (function of the flexibility or non-flexibility thereof);
  to the acquisition and generation system of the computer; and
  to the failure modes of the computer.

Consequently, a particular family of aircraft each time has a corresponding particular usual solution, which does not offer any guarantee of being applicable to another family of aircraft, whether existing or future.

Furthermore, the usual monitoring solutions generally have a restricted coverage, by more often than not performing only a detection of the oscillations generated by a particular component of the automatic control chain.

The patents FR-2 893 911 and FR-2 936 067 make it possible to at least partially remedy these drawbacks. The patent FR-2 893 911 notably provides for comparing the real operation of the automatic control chain monitored (which is illustrated by the measured actual position), to a failure-free expected ideal operation (which is illustrated by a theoretical position obtained from a model), which makes it possible to reveal any oscillatory failure when it occurs.

The model-based monitoring procedures have demonstrated their benefit and their applicability to the detection of oscillatory failures. By definition, they rely on the knowledge of a model, specific to each type of actuator, and their performance levels depend on the quality of these models (representativeness, uncertainties, model noises, etc.). However, a method developed for a conventional hydraulic actuator, with a model specific to this type of actuator, cannot be adapted to another type of actuator (for example of EHA, Electro-Hydrostatic Actuator, type), the physical principle and the operation of which are governed by different principles, and which is therefore described by a different model. Adaptive algorithms (for example of EKF, Extended Kalman Filter, type) can compensate these model differences, but only to a certain extent. It is therefore necessary to develop a model for each type of actuator and, in practice, some types of models lend themselves better to model-based failure detection methods than others. Thus, a physical model is well suited to observer-type techniques whereas a model of transfer function, or transfer function network type, is more difficult to use for this type of method.

SUMMARY OF THE INVENTION

An object of the present invention is to provide an alternative approach, not based on models, for the detection of the oscillatory failures in the automatic control loops.

This novel approach must retain, even improve if possible, the robustness and the performance levels of the model-based approaches. It concerns detecting failures of low amplitudes rapidly, compatible with structural design requirements. It also concerns finding a more generic method than the approaches based on models, that is to say which can be adapted easily from one type of actuator to another, with high-level setting parameters which can easily be adapted by an operator or a system designer. The computational complexity must also be controlled to remain compatible with the limited processing capacities of the flight control computers.

An object of the present invention is to remedy the abovementioned drawback of the prior art. It relates to a method for detecting at least one oscillatory failure in at least one automatic position control chain of at least one control surface of an aircraft, in particular of a transport airplane, not based on models, and which is robust and efficient. This automatic control chain is of the type comprising:

- the control surface which is mobile, and the position of which relative to the aircraft is set by at least one actuator;
- the actuator which sets the position of the control surface, according to at least one actuation order received;
- at least one sensor which measures a position value representative of the actual position of the control surface; and
- a computer which generates a (control surface) control order, which receives the measured position value and which deduces therefrom an actuation order which is transmitted to the actuator.

To this end, according to the invention, the method comprises the following series of successive steps, implemented automatically and iteratively:

a) a first data processing step comprising determining a first trend of the control order as a function of time, the first trend being defined according to a reference parameter (for example, an angle of travel of the control surface or a displacement of a rod of the actuator);

b) a second data processing step comprising determining at least one second trend of the position value as a function of time, the second trend being also defined according to the reference parameter; and c) a monitoring step comprising comparing the first and second trends to verify the existence of a correlation between these first and second trends so as to detect an oscillatory failure as soon as a loss of correlation between the first and second trends appears, if necessary.

Thus, by virtue of the invention, the oscillatory failures are detected by exploiting the behavioral differences between the signals circulating in the automatic control loop in the nominal case (failure-free) and in the defective case (presence of oscillatory failure). In effect:

- in the absence of failure, there is a strong correlation between the trend of the control order ("control" or "automatic control setpoint") and the trend of the position of the rod of the actuator and/or of the position of the control surface, the two trends being defined according to the same parameter (for example an angle of travel of the control surface or a displacement of a rod of the actuator); and
- in the case of an oscillatory failure, there is a loss of correlation (or of similarity) between the different trends.

The detection method makes it possible to exploit this loss of correlation (or of similarity), between the different signals circulating in the automatic control loop, and do so in order to differentiate the failure-free case from the case of erroneous operation.

The method is advantageous compared to model-based approaches, since it does not require the knowledge of such a model, and therefore has a generic nature making it possible to apply the same method in different contexts (for example a different control surface of a different airplane with different actuators). Furthermore, the method according to the invention avoids the use of specific sensors or gauges for estimating the parameter(s) of the model of the actuator and therefore does not have a negative impact on the weight budget.

Moreover, advantageously, the second data processing step comprises determining at least one second position value trend from at least one position value from at least one of the following two sensors: a sensor for measuring a position of a rod of the actuator and a sensor for directly measuring a position of the control surface.

Furthermore, advantageously, the monitoring step comprises a high-frequency monitoring substep and a low-frequency monitoring substep, as well as a filtering substep.

In a preferred embodiment, the high-frequency monitoring substep comprises:

- a distance computation step comprising computing the distance between the first and second trends over time;
- a comparison step comprising comparing this distance to a first detection threshold value; and
- a detection step comprising detecting an oscillatory failure when the distance is greater than the detection threshold value for a first predetermined duration.

In this case, advantageously, the distance computation step comprises computing a Euclidean distance.

Furthermore, in a preferred embodiment, the low-frequency monitoring substep comprises:

- a distance computation step comprising computing three distances between the following three trends taken two by two, that is to say in computing three distances between, each time, two of the following three trends: the first trend relating to the control order, a second trend relating to a position of a rod of the actuator, and a second position value relating to a position of the control surface,
- a comparison step comprising comparing these three distances to a second detection threshold value, for example equal to the first detection threshold value; and
- a detection step comprising detecting an oscillatory failure as soon as at least two of the three distances are greater than the second detection threshold value for a second predetermined duration, for example equal to the first predetermined duration.

In this case, advantageously, the second position value relating to the position of the control surface takes into account one of the following values:

- a control surface position measured directly by a control surface position measurement sensor;
- an estimated control surface position.

Furthermore, advantageously, the distance computation step comprises computing a Euclidean distance and in weighting this Euclidean distance by a correction factor.

Moreover, advantageously, the detection method also comprises:

- a step of setting a detection threshold; and/or
- a first preprocessing step comprising implementing a signal recentering; and/or
- a second preprocessing step comprising implementing a compensation of a drag error.

The present invention relates also to a device for automatically detecting at least one oscillatory failure in at least one automatic position (of the abovementioned type) control chain of at least one control surface (aileron, spoiler, elevator, rudder) of an aircraft, in particular of a transport airplane.

According to the invention, the detection device comprises:

a first data processing unit configured to determine a first trend of the control order as a function of time, the first trend being defined according to a reference parameter;

a second data processing unit configured to determine at least one second trend of the position value as a function of time, the second trend being also defined according to a reference parameter; and a monitoring unit configured to compare the first and second trends in order to verify the existence of a correlation between these first and second trends so as to detect an oscillatory failure as soon as a loss of correlation between the first and second trends appears, if necessary.

The present invention relates also to a system of electrical flight controls of an aircraft, of the type comprising:

at least one standard means (comprising, for example, a control column) for generating (control surface) control data (or information) for at least one control surface of the aircraft; and at least one automatic position control chain of this control surface, of the abovementioned type.

According to the invention, this system of electrical flight controls comprises, in addition, at least one device for detecting oscillatory failures, as described previously.

The present invention further relates to an aircraft, in particular a transport airplane, which comprises a device for detecting oscillatory failures and/or a system of electrical flight controls, as specified above.

BRIEF DESCRIPTION OF THE DRAWINGS

The attached figures will give a clear understanding of how the invention can be produced. In these figures, identical references denote similar elements. More particularly.

DETAILED DESCRIPTION OF THE PREFERRED EMBODIMENTS

Figure 1:
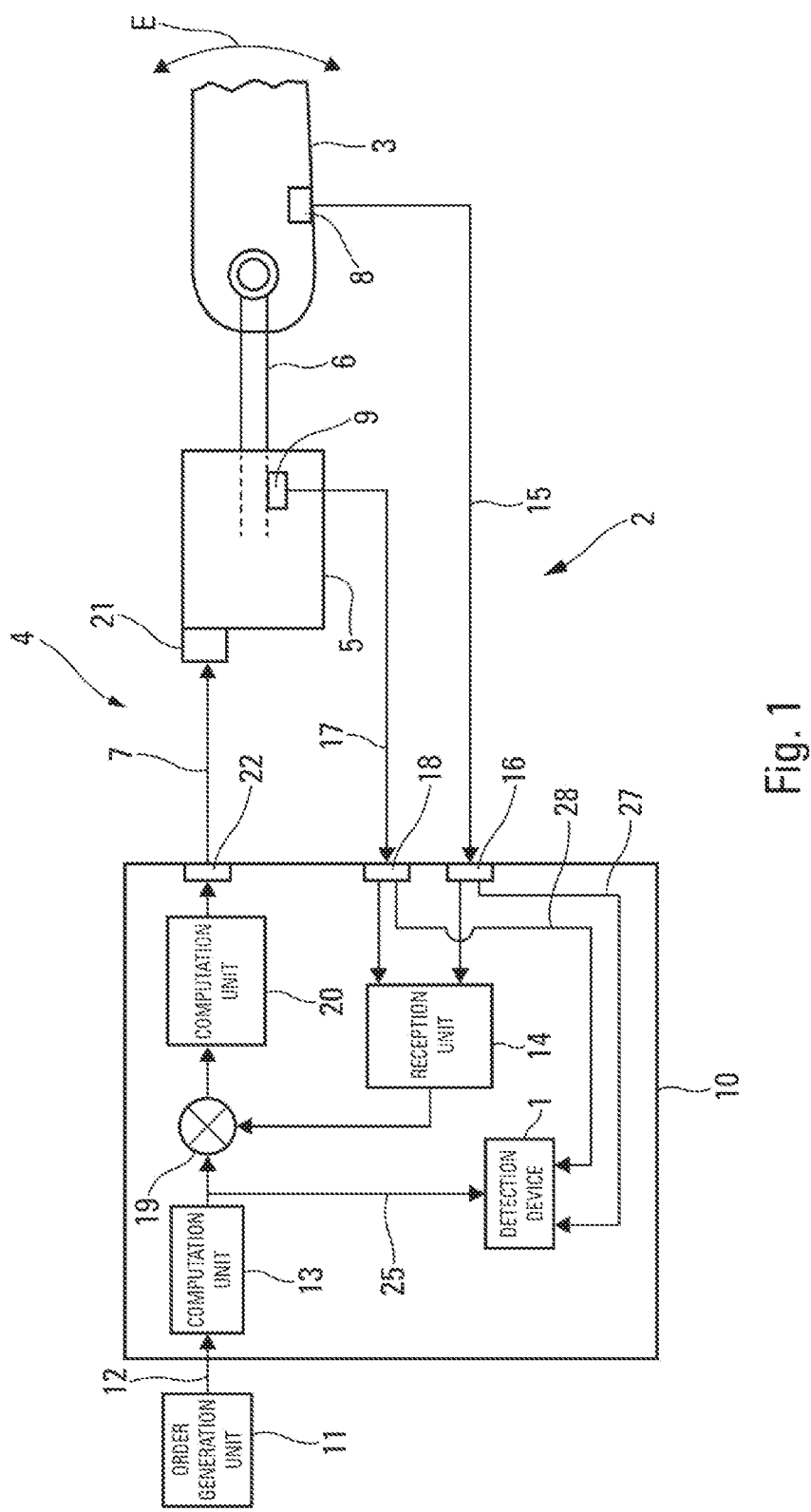
FIG. 1 schematically illustrates an automatic position control chain of an aircraft control surface, which comprises a detection device.

The detection device 1 (DETECTION DEVICE) used to illustrate the invention and schematically represented in FIG. 1 is intended to detect at least one oscillatory failure in at least one automatic position control chain 2 of at least one control surface 3 (aileron, spoiler, elevator, rudder) of an aircraft, in particular of a transport airplane.

Usually, this automatic control chain 2 forms part of a system of electrical flight controls 4 of the aircraft and comprises:

the control surface 3 which is mobile, by being able to be turned as illustrated by a double arrow E in FIG. 1, and the position of which relative to the structure of the aircraft is set by at least one standard actuator 5;

the actuator 5 which sets the position of the control surface 3, for example via a rod 6 acting thereon, according to at least one actuation order received via a link 7;

at least one sensor 8, 9 which measures the actual position of the control surface 3. To this end, it can be a sensor 8 which is directly associated with the control surface 3 and/or a sensor 9 which measures the displacement of the rod 6 of the actuator 5; and a computer 10, for example a flight control computer:

which receives control information or data from a unit 11 generating control information (ORDER GENERATION UNIT), representing turn orders, via a link 12. This unit 11 for generating control information comprises, for example, a standard control column (not represented) which can be actuated by a pilot of the aircraft and inertial sensors;

which generates, in the usual manner, a (control surface) control order, using an integrated computation element 13 (COMPUTATION UNIT) which contains piloting laws and which uses, for this generation, control data or information (for example, action by the pilot on the control column, parameters which indicate the position of the aircraft about its center of gravity, load factors that it undergoes) received from the unit 11;

which receives, on a reception element 14 (RECEPTION UNIT), the position value measured by the sensor 8, via a link 15, via an input 16 of analog type, and/or the position value measured by the sensor 9, via a link 17, via an input 18 of analog type;

which computes, from the preceding information (control surface control order and measured actual position(s)), taken into account via an element 19, the actuation order, using an integrated computation element 20 (COMPUTATION UNIT), notably taking into account a gain; and which transmits this actuation order to a component 21 which makes it possible to convert this order into movement of the rod of the actuator 5 (for example a servo valve in the case of a standard hydraulic servo control), via the link 7 via an output 22 of analog type.

All the elements of this automatic control chain 2 which contain electronic components, and notably the inputs 16 and 18 and the output 22, can be sources of oscillatory failures, that is to say of failures which are likely to generate a spurious electric signal which can cause the control surface 3 to oscillate. It is considered that the main sources of oscillatory failures can be modeled as originating either from the digital/analog output 22, or from the analog/digital inputs 16 and 18. A failure of mechanical origin within the actuator can thus be likened to a failure on the digital/analog output.

The system of electrical flight controls 4 comprises, in addition to the automatic control chain 2, the detection device 1 which is intended to detect any oscillatory failure of the abovementioned type.

In a preferred embodiment represented in FIG. 1, the detection device 1 is integrated in the computer 10.

Figure 2:
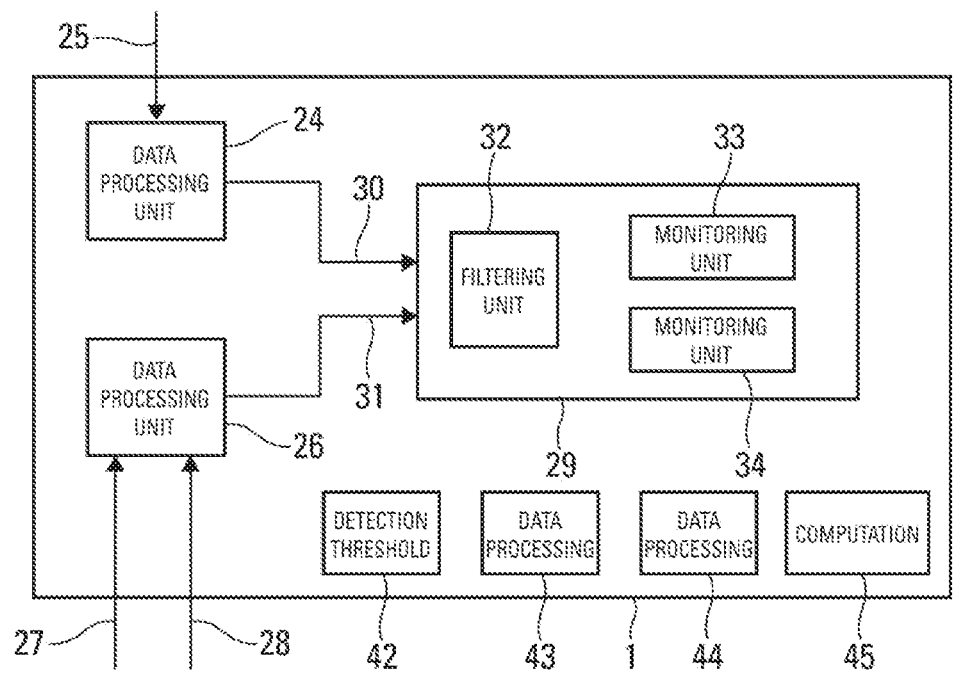
FIG. 2 is a block diagram of a detection device according to a preferred embodiment of the invention.

The detection device 1 comprises, as represented in FIG. 2:

a data processing unit 24 (DATA PROCESSING UNIT) configured to determine a trend of the control order as a function of time, called first trend. The first trend is defined according to a so-called reference parameter (for example an angle of travel of the control surface 3, expressed, in particular, in degrees, or a displacement of the rod 6 of the actuator 5, expressed, in particular, in millimeters). For this, the data processing unit 24 is linked, via a link 25, to the computation element 13 which supplies the control order;

a data processing unit 26 (DATA PROCESSING UNIT) configured to determine at least one trend of the position value as a function of time, called second trend.

The second trend is defined according to the same reference parameter as the first trend so as to be able to compare the two trends, as specified hereinbelow. For this, the data processing unit 26 is linked, via links 27 and 28, respectively, to the inputs 16 and 18 which supply position values; and a monitoring unit 29 linked via links 30 and 31, respectively, to the data processing units 24 and 26 and configured to compare, in the manner specified hereinbelow, the first and second trends (which are defined according to the same parameter) in order to verify the existence of a correlation between the first and second trends so as to detect an oscillatory failure as soon as a loss of correlation between these first and second trends appears, if necessary.

The data processing unit 26 is configured to determine at least one second position value trend, from at least one position value from at least one of the following two sensors 8 and 9:

the sensor 8 of RVDT (Rotary Variable Differential Transducer) type, which directly measures the position of the control surface 3 (hereinafter "RVDT measurement"); and the sensor 9 of LVDT (Linear Variable Differential Transducer) type, which measures the position of the rod 6 of the actuator 5 (hereinbelow "LVDT measurement").

Thus, the detection device 1 detects the oscillatory failures by exploiting the differences in behavior between the signals circulating in the automatic control loop in the nominal case (failure-free) and in the defective case (presence of an oscillatory failure). In effect:

in the absence of failure, there is a strong correlation between the control order (or "automatic control setpoint") and the position of the rod 6 of the actuator 5 and/or the position of the control surface 3; and in the case of an oscillatory failure, there is a loss (or absence) of correlation (or of similarity) between the different signals.

The detection device 1 makes it possible to exploit this loss of correlation (or of similarity), between the different signals circulating in the automatic control loop, and does so in order to differentiate the failure-free case from the case of an erroneous operation.

Figure 3:
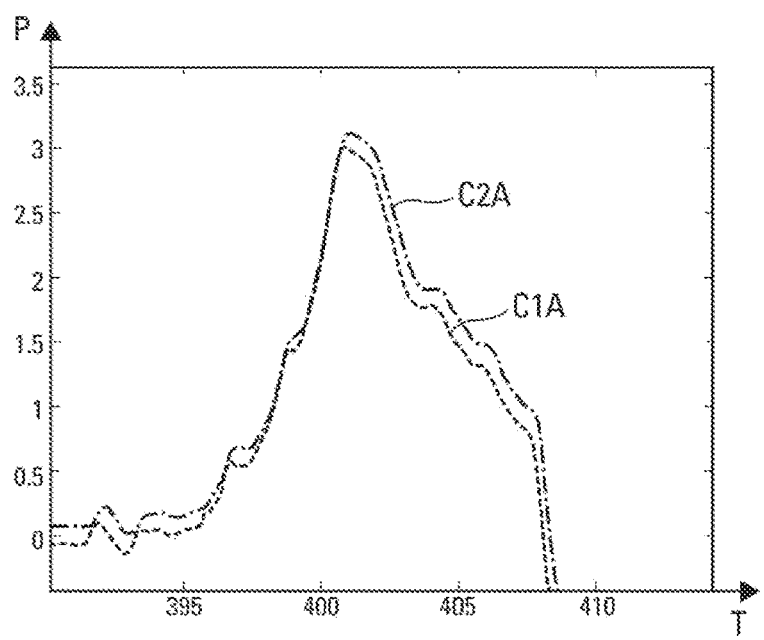
FIGS. 3 and 4 are graphs illustrating trends of parameters, respectively, in a situation of normal operation and in a situation of failure.

In failure-free operation, the trend of the control order revealed by the curve C1A in FIG. 3 and the trend of the position value of the control surface (position of the rod or direct position of the control surface) revealed by the curve C2A, are strongly correlated. FIG. 3 shows a graph illustrating the reference parameter P (expressed in a corresponding unit, for example in degrees for an angle of travel of the control surface, or in millimeters for a displacement of the rod of the actuator) as a function of time T (expressed in a time unit). There is a delay between the two curves, called "drag error", which corresponds to the response time of the actuator 5 to the control order. Between the computation of the automatic control current in the computer and its mechanization within the actuator there is in fact a delay of a few tens of milliseconds. To within this delay, the two signals are very similar, because the position signal corresponds to the mechanization of the control within the actuator, by virtue of the automatic control. Slight differences of amplitude (attenuation or amplification) may also appear, for example in the case of significant aerodynamic loads or for the high frequencies where the actuator acts as a low-pass filter.

Figure 4:
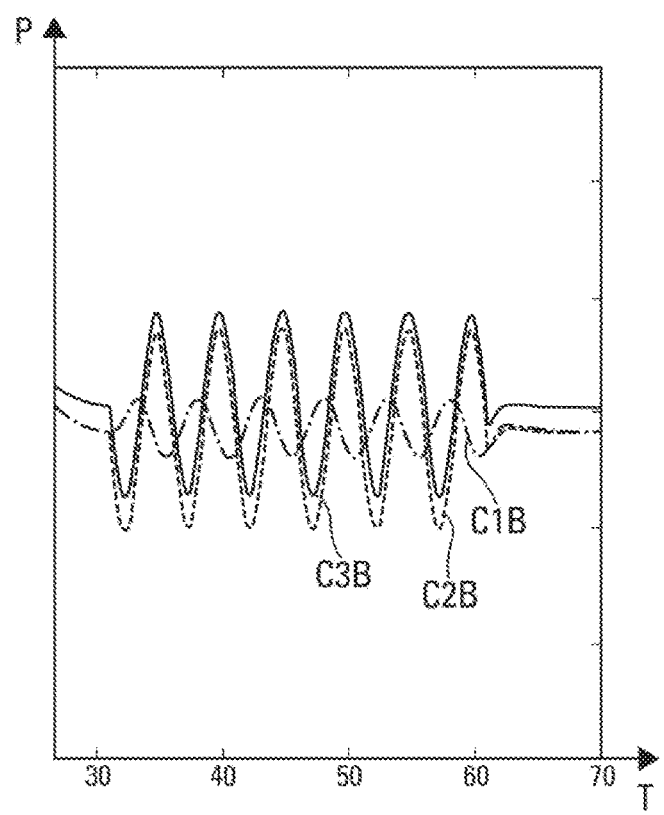

On the other hand, in case of failure, a loss of correlation (or of similarity) appears between the trend of the control order revealed by a curve C1B in FIG. 4 and the relevant trend or trends of the position value, revealed by the curves C2B and C3B corresponding respectively to LVDT and RVDT measurements. FIG. 4 shows a graph illustrating the reference parameter P (expressed in a corresponding unit) as a function of the time T (expressed in a time unit). According to the type of failure (liquid (that is to say an additive failure) or solid (that is to say a failure which fully replaces the nominal signal)) and the frequency of the failure, the differences can vary substantially, but a loss of correlation is always observed. The appearance of the failure can lead to an undesirable movement of the aircraft, which will be measured by the sensors measuring the trim of the aircraft and therefore interpreted by the piloting laws which will naturally seek to compensate the effect of the failure. According to the frequency of the failure, this compensation will be more or less effective, but there will always remain a significant difference with the nominal behavior in the absence of failure.

Compared to model-based approaches, the detection device 1 does not require the knowledge of a model, and therefore has a generic nature making it possible to apply the same method in different contexts (for example to a different control surface of a different aircraft with different actuators).

Furthermore, the detection device 1 avoids having to use specific sensors or gauges, notably to estimate the parameter(s) of the model of the actuator, and does not therefore have a negative impact on the weight budget.

The detection device 1 comprises software means which make it possible to detect oscillatory failures (solid and liquid) in the automatic position control loop of at least one control surface of an aircraft. The detection device 1 can be used to improve the controllability of the aircraft and participate in the optimization of its structural design (weight gain).

Furthermore, the device 1 makes it possible to detect all the oscillatory failure modes existing in the automatic control chain 2 of abovementioned type, and is applicable to any type of aircraft.

The monitoring unit 29 can take into account an indicator signal I(t) which is able to reveal the loss of similarity (or of correlation) between the signals available in the automatic control loop: control order, called U, LVDT measurement and RVDT measurement. In the ideal case:

I(t)=0, in the absence of oscillatory failure; and
I(t)=1, in the presence of an oscillatory failure.

In the real case, because of the presence of measurement noises, of delays, of any limitations (differences in amplitude, frequency, etc.) and because of the very nature of the indicator, the indicator signal is much more disturbed and more difficult to interpret, requiring the use, for example, of a (fixed or adaptive) threshold-based logic.

In the simplest mode of implementation, only the control order U and the LVDT measurement are available and used. In some cases (on some control surfaces of some aircraft), it is also possible to have all three information items: control order U, LVDT measurement and RVDT measurement.

Moreover, the monitoring unit 29 comprises, as represented in FIG. 2, a filtering subunit 32 (FILTERING UNIT), and a high-frequency monitoring subunit 33 (MONITORING UNIT) and a low-frequency monitoring subunit 34 (MONITORING UNIT).

Since the frequency of the failure and its instance of occurrence are unknown, two detection strategies are implemented in parallel, respectively at low frequency and at high frequency. In order to disassociate these two bands, there is first applied, via the filtering subunit 32, a bank of two bandpass filters, for example recursive (IIR, Infinite Impulse Response), of the Tchebychev or elliptical type. The sub-band filtering operation also makes it possible to eliminate the noise, reduce the influence of any bias and more easily set the thresholds on the sliding window-based distance measurements.

Two cases therefore have to be disassociated, according to the frequency of the failure. More specifically:
at high frequency, the effect of the failure does not have sufficient consequences to disrupt the control of the aircraft. However, there is a structural effect, that is to say a generation of additional loads on the structure. A sufficiently significant deviation therefore appears between the control order U (which does not react) and the LVDT measurement. These two measurements are therefore sufficient to detect the failure; and
at low frequency, the effect of the failure on the movements of the aircraft can be significant. Consequently, the control law will react via the movements measured by the standard sensors (for example, clinometric, inertial, etc.) and therefore seek to counter the failure. It is therefore possible to find on the control, oscillations of the same frequency as the failure, with amplitudes and phase shifts that may be different or relatively close together and therefore that make the detection more difficult. In this case, the processing of only the control order U and the LVDT measurement may not be sufficient, and the RVDT measurement must be used to eliminate the doubt, because the failure can have different consequences depending on its origin.

In effect, it can be demonstrated that, depending on the origin of the failure and in certain conditions, the RVDT measurement systematically translates the real oscillation of the control surface, while the acquisition in the computer of the LVDT measurement may not be totally representative of the real oscillation amplitude.

In another failure mode, the reverse can occur. The LVDT measurement may be more favorable (that is to say higher) than the RVDT measurement. Consequently, depending on the origin of the failure, the values of the RVDT and LVDT measurements are not necessarily equal, and therefore the monitoring unit 29, to be more effective, uses one or other of these values (or both).

Figure 5:
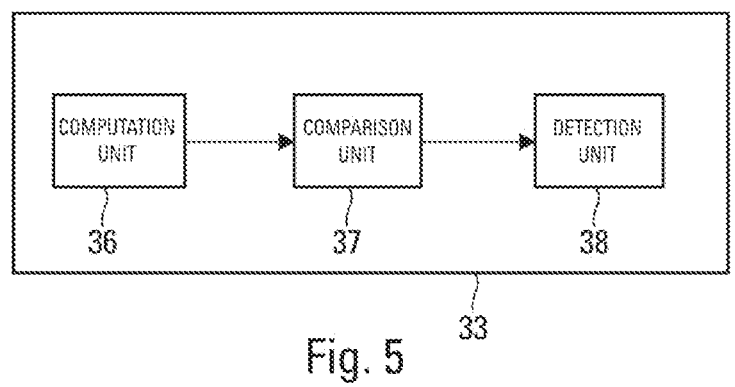
FIGS. 5 and 6 are block diagrams of monitoring subunits for signals, respectively, at high frequency and at low frequency.

In a preferred embodiment, the high-frequency monitoring subunit 33 of the monitoring unit 29 comprises, as represented in FIG. 5:
a computation unit 36 (COMPUTATION UNIT) configured to compute the distance (or difference) between the first and second trends over time;
a comparison unit 37 (COMPARISON UNIT) linked to the computation unit 36 and configured to compare this distance to a detection threshold value $\alpha(t)$; and
a detection unit 38 (DETECTION UNIT) linked to the comparison unit 37 and configured to detect an oscillatory failure when the distance is greater than the detection threshold value $\alpha(t)$ for a predetermined duration T$\alpha$.

In this case, the computation unit 36 computes a Euclidean distance, namely a distance d(U,LVDT) between the control order U and the LVDT measurement, which is compared to the detection threshold value $\alpha(t)$ by the comparison unit 37. Furthermore, the detection unit 38 therefore concludes:
if d(U,LVDT)>$\alpha(t)$ for the duration T$\alpha$, that an oscillatory failure has been detected; and
if d(U,LVDT)<$\alpha(t)$, that there is an absence of oscillatory failure.

The value of the detection threshold $\alpha(t)$ can be set ($\alpha(t)$=K, K being a constant) or else be adaptive, that is to say that the value varies over time, according to particular conditions such as, for example, the dynamics of the control or the outside conditions.

At high frequency, the computation unit 36 implements, preferably, a simple Euclidean distance computation which, in dimension 1, is simply the absolute value between two scalars x and y: |x-y|. In the case of two temporal series x and y, the computation unit 36 computes the distance d(x,y) using the following expression:

$$d(x, y) \sqrt{\sum_{i=1}^{N} (x_i - y_i)^2}$$

In this expression, N corresponds to the width of a sliding window and i corresponds to a sampling index. The computation unit 36 therefore performs this computation within a sliding window whose size is linked to the frequency band targeted for monitoring.

Figure 6:
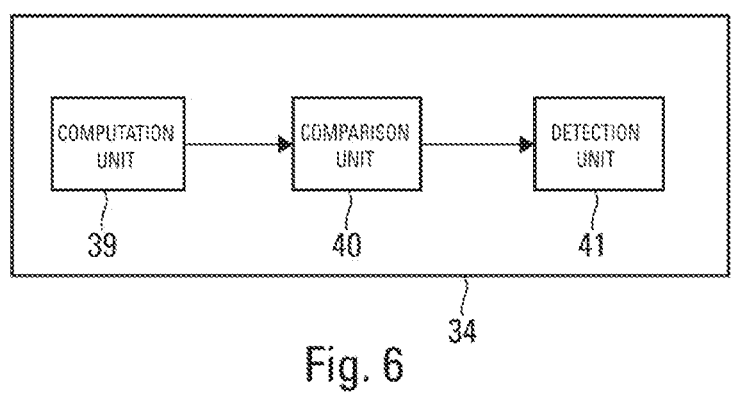

Moreover, in a preferred embodiment, the low-frequency monitoring subunit 34 comprises, as represented in FIG. 6:
a computation unit 39 (COMPUTATION UNIT) configured to compute three distances (or differences) between the following three trends: the first trend relating to the control order U, a second trend relating to the LVDT measurement (position of the rod 6 of the actuator 5), and a second position value relating to the RVDT measurement (position of the control surface 3);
a comparison unit 40 (COMPARISON UNIT) linked to the computation unit 39 and configured to compare these three distances to a detection threshold value which corresponds, for example, to the detection threshold value used by the comparison unit 37; and
a detection unit 41 (DETECTION UNIT) linked to the comparison unit 40 and configured to detect an oscillatory failure as soon as at least two of the three distances are greater than the threshold value for a predetermined duration, preferably equal to the duration taken into account by the detection unit 38.

In the case where an RVDT measurement is available, that is to say notably when the control surface 3 is equipped with a sensor 8 of RVDT type, the computation unit 39 computes the distances: d(U, LVDT), d(U, RVDT) and d(LVDT, RVDT) between the three parameters (control U, LVDT measurement, RVDT measurement), two by two. The comparison unit 40 then uses the following logic table:
if d(U, LVDT)=d(U, RVDT)=d(LVDT, RVDT)=0, there is no failure;
if d(U, LVDT)=d(U, RVDT)=1 and d(LVDT, RVDT)=0, a failure is detected, its origin being a digital/analog output; and
if d(U, LVDT)=0 or 1 and d(U, RVDT)=d(LVDT, RVDT)=1, a failure is detected, its origin being an analog/digital input.

In this table, "0" signifies that d(x,y)<$\alpha(t)$ and "1" signifies that d(x,y)>$\alpha(t)$ for a time T$_\alpha$, with x and y being able to be either U, LVDT or RVDT.

Use is therefore made of the fact that, in case of failure, whatever its origin, at least two values are not similar.

In a particular embodiment, the comparison unit 40 uses only d(U, RVDT). It is the only distance which systematically has the value 1, whatever the origin of the failure.

If the control surface 3 is not equipped with a sensor 8 of RVDT type, the computation unit 39 (or the data processing unit 26) estimates, in a first stage, this position, or an equivalent quantity, then it computes distances between the three parameters two by two, and the comparison unit 40 uses the same logic table as for the case of a control surface with an RVDT sensor.

For this estimation, the knowledge of the automatic control current i(t), for example, makes it possible to obtain the speed of the rod of the actuator (that is to say via a small model of the servo-valve, in the case of a conventional servo-control). The derivation of the control order U and of the LVDT measurement makes it possible to be able to compare homogenous quantities. Thus, there are three homogenous values available that can be compared.

At low frequency, because of the reaction of the law which seeks to counter the failure, or depending on the origin of the failure, a simple computation of distance between the control order U and the LVDT measurement is not therefore always sufficient to reveal the failure. Similarly, a Euclidean distance computation may not be sensitive enough to reveal the differences between the three values U, LVDT and RVDT. So, a measurement is preferably used that is sensitive to the distance and to the overall complexity of the signal, such as, for example, a metric called "Complexity Invariant Distance", hereinafter designated "CID distance".

The CID distance comprises weighting the Euclidean distance d(x,y) by a correction factor CE(x) which reflects the intuitive idea that, if a disturbed signal is stretched until it becomes a straight line, then it will be longer than a relatively undisturbed signal.

The CID distance is expressed as follows:

$$CID(x, y) = d(x, y) \cdot c_f$$

with:

$$c_f = \frac{\max(CE(x), CE(y))}{\min(CE(x), CE(y))}$$

and:

$$CE(x) \sqrt{\sum_{i=1}^{N-1} (x_i - x_{i+1})^2}.$$

In some situations, the computation of the Euclidean distance only does not make it possible to detect a failure, because it has the same value in dynamic phase and in case of failure. However, the CID distance, by virtue of the weighting coefficient $c_f$, makes it possible to detect the failure, for example, using a threshold-based logic.

In a particular embodiment, the computation unit 39 computes the coefficient CE as a sum of distances (and not as the square root of the sum, as in the initial definition of the CID). That therefore amounts to displacing the square root term before computing the sum by sliding window. A curvilinear real distance is thus computed, which also makes it possible to be more robust numerically, while keeping the properties of the corrective factor CE.

Moreover, the detection device 1 also comprises, as represented in FIG. 2, a setting unit 42 making it possible to set the detection threshold (DETECTION THRESHOLD).

This setting unit 42 makes it possible to implement a fine setting of the detection threshold which must conform to the requirements of robustness (threshold high enough to avoid false alarms) and of performance (threshold low enough to avoid the absence of detections). Three different embodiments are provided.

In a first embodiment, a Euclidean distance is computed. In this case, a first threshold value is computed, which is used as a point of departure for a more empirical refined setting. The case of a high-frequency failure is considered, therefore one without reaction of the law. There is therefore, x being nil and y being equal to the failure signal, a sinusoid of the type A·sin(ωt+φ) with ω being the pulsing, A being the failure amplitude to be detected and φ being the phase.

$$d(0, y) = \sqrt{\sum_{i=0}^{N} A^2 \sin^2(\omega t(i) + \phi)}$$

By numerical simulation, by considering the entire range of frequencies and of phases possible, for a given window length, it is possible to determine the minimum value of d(0,y) which corresponds to the presence of a failure of amplitude A. This value serves as initial threshold, subject to a margin to be defined.

By taking the assumption, in discrete time, that ω2πft=2πfnT_e, with T_e being the sampling period, and that the control is nil, the following analytical solution is arrived at:

$$d = \sqrt{\sum_{n=0}^{N} (x_n - y_n)^2} = \sqrt{\sum_{n=0}^{N} (A\sin(2\pi fnT_e + \phi))^2}$$

By using the usual trigonometrical relations, this expression is simplified to:

$$d = A\sqrt{\frac{N}{2} - \frac{1}{2}\sum_{n=0}^{N} \cos(2k_1 n + 2\phi)}$$

$$d = A\sqrt{\frac{N}{2} - \frac{1}{2}\left[\frac{\sin((N+1)k_1)}{\sin(k_1)}(\cos(2\phi)\cos(Nk_1) - \sin(2\phi)\sin(Nk_1))\right]}$$

with: $k_1 = 2\pi fT_e$.

A rapid analysis shows that the dominant term is simply:

$$A\sqrt{\frac{N}{2}}.$$

It is possible to determine a first setting threshold from the amplitude A of failure to be detected and from the width N of the sliding window.

In a second embodiment, the setting threshold is computed in the worst case defined by a very dynamic maneuver combined with a delay, a bias, a measurement noise, errors (static, dynamic, mechanical, etc.), which are deemed dimensioning for the system concerned. Next, iteratively and empirically, the setting threshold is adjusted so as to meet the specifications (that is to say the failure amplitude to be detected in the time allotted).

Moreover, in a third embodiment, in the context of a test of hypothesis, a first threshold value is computed, which serves as point of departure for a more empirical refined setting. The test of hypothesis comprises choosing between two possible options:

under the hypothesis H0, there is no failure;
under the hypothesis H1, there is a failure.

From this definition, a probability of false alarm (probability $P_{FA}$ of choosing the hypothesis H1, whereas the reality corresponds to H0) and a probability of absence of detection (probability $P_{ND}$ of choosing the hypothesis H0, whereas the reality corresponds to H1) are defined.

In the case where the aim is to detect a jump in the Euclidean distance (presence of a failure), it is possible to use a Neyman-Pearson detector which makes it possible to set a threshold which guarantees a maximum probability of detection for a given probability $P_{FA}$. Under the hypothesis of a random signal x, of nil average, embedded in a Gaussian white noise, the hypothesis H1 is decided if:

$$\sum_{i=0}^{N-1} x_i^2 \Big| \sigma^2 Q_{x_n^2}(P_{fa})^{-1}$$

N is the width of the sliding window, x is the difference between the control and the position (U-LVDT), also called residue, that is to say the difference between the two signals for which the distance is computed, σ2 is the variance of the residue without failure, and $Q_{x_n^2}$ is a function called "Q-function" which gives a weighting coefficient to the variance as a function of the tolerated probability of false alarm.

Since the Euclidean distance is defined by $$d(x, y) = \sqrt{\sum_{i=1}^{N} (x_i - y_i)^2},$$

it will be necessary to take the square root of the straight line term in the expression above.

Moreover, the detection device 1 also comprises, as represented in FIG. 2, a preprocessing unit 43 for the data processing (DATA PROCESSING), configured to implement a recentering of the signal.

In order to improve the distance computation, this preprocessing unit 43 adjusts the signal to a nil average, subtracting its average value over a sliding window.

Moreover, the detection device 1 also comprises, as represented in FIG. 2, a preprocessing unit 44 (DATA PROCESSING) configured to take into account a compensation of a drag error (delayed between the control and the position), in order to improve the distance computation. To do this, it is possible to estimate an average delay after analysis of a large number of data. In this case, the delay will be constant and implemented as a simple delay. It is also possible to proceed with an in-line estimation of a variable bias in time, for example using a recursive least square (RLS) estimator.

Moreover, the detection device 1 also comprises, as represented in FIG. 2, a computation unit 45 (COMPUTATION) configured to compute another index.

By keeping the same principle as the CID, that is to say weighting the Euclidean distance (which reflects the differences between the values of the signals) with an index which reflects the complexity of the signals, the computation unit 45 defines another index which reflects the similarity in terms of forms of the signals, or even in terms of correlation:

$$d_s(x,y) = d(x,y) \cdot COR(x,y)$$

in which COR(x,y) is a coefficient reflecting the correlation between the two signals x and y, that is to say their resemblance in terms of statistics of the signals, or their resemblance in terms of forms between the signals.

The following is, for example, used:

$$COR(x, y) = \frac{2}{1 + e^{K r_{xy}}}$$

in which K is a constant which serves as setting parameter and which makes it possible to give greater significance, either to the Euclidean distance or to the correlation coefficient $r_{xy}$.

By way of example, the correlation coefficient can correspond to the Pearson correlation coefficient, which bears out the following relationship:

$$r_{xy} = \frac{\sum_{i=1}^{n}(x_i - \bar{x})(y_i - \bar{y})}{\sqrt{\sum_{i=1}^{n}(x_i - \bar{x})^2 \sum_{i=1}^{n}(y_i - \bar{y})^2}}$$

in which $\bar{x}$ is the average value of x, and $\bar{y}$ is the average value of y.

If the detection device 1 processes the first derivatives of the signals, to give even greater significance to their dynamics rather than to their numerical value, it can use the following time correlation coefficient:

$$r_{xy} = \frac{\sum_{i=1}^{n}(x_{i+1} - x_i)(y_{i+1} - y_i)}{\sqrt{\sum_{i=1}^{n}(x_{i+1} - x_i)^2 \sum_{i=1}^{n}(y_{i+1} - y_i)^2}}.$$

The detection device 1, as described above, therefore implements an alternative approach, not based on models, for the detection of the oscillatory failures in the automatic control loops. This approach makes it possible to retain, even improve, the robustness and the performance levels of the model-based approaches. It makes it possible to detect failures of low amplitudes in a very short time, compatible with the structural design requirements.

Furthermore, the detection device 1 adapts easily to any type of actuator with high-level setting parameters that can easily be adapted by an operator or a systems designer. Furthermore, the implementation of the different computations is compatible with the limited processing capacities of the flight control computers.

The detection device 1 therefore implements a detection method that makes it possible to detect oscillatory failures based on processing of the signal, regardless of the origin of the failure, by exploiting the properties of the signals measured or computed and available in the automatic control loop, and more particularly by exploiting the differences in behavior between the signals circulating in the automatic control loop in the nominal case (failure-free) and in the defective case (presence of oscillatory failure). For this, the detection device 1 takes account of the fact:

that, in the absence of failure, there is a strong correlation between the control order and the position of the rod of the actuator (LVDT) and/or the position of the control surface (RVDT); and that, in case of oscillatory failure, there is a loss of correlation (or of similarity) between the different signals.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for detecting at least one oscillatory failure in at least one automatic position control chain of at least one control surface of an aircraft, the automatic control chain forming part of a system of electrical flight controls of the aircraft and comprising:
   the control surface which is mobile, and the position of which relative to the aircraft is set by at least one actuator;
   the actuator which sets the position of the control surface, according to at least one actuation order received;
   at least one sensor which measures a position value representative of the actual position of the control surface; and
   a computer which generates a control order using a computation element, which receives the measured position value and which deduces therefrom an actuation order which is transmitted to the actuator,
   wherein the method comprises the following series of successive steps, implemented automatically and iteratively:
   a) a first data processing step comprising determining a first trend of the control order as a function of time, the control order being supplied by the computation element, the first trend being defined according to a reference parameter;
   b) a second data processing step comprising determining at least one second trend of the position value as a function of time, the second trend being also defined according to the reference parameter; and
   c) a monitoring step comprising comparing the first and second trends to verify the existence of a correlation between these first and second trends so as to detect an oscillatory failure as soon as a loss of correlation between the first and second trends appears if necessary.

2. The method as claimed in claim 1, wherein the second data processing step comprising determining at least one second position value trend from at least one position value from at least one of the following two sensors: a sensor for measuring a position of a rod of the actuator and a sensor for directly measuring a position of the control surface.

3. The method as claimed in claim 1, wherein the monitoring step comprises a high-frequency monitoring substep and a low-frequency monitoring substep, as well as a filtering substep.

4. The method as claimed in claim 3, wherein the high-frequency monitoring substep comprises:
   a distance computation step comprising computing the distance between the first and second trends over time;
   a comparison step comprising comparing this distance to a first detection threshold value; and
   a detection step comprising detecting an oscillatory failure when said distance is greater than said detection threshold value for a first predetermined duration.

5. The method as claimed in claim 4, wherein the distance computation step comprises computing a Euclidean distance.

6. The method as claimed in claim 3, wherein the low-frequency monitoring substep comprises:
   a distance computation step comprising computing three distances between, each time, two of the following three trends: the first trend relating to the control order, a second trend relating to a position of a rod of the actuator, and a second trend relating to a position of the control surface;
   a comparison step comprising comparing these three distances to at least one second detection threshold value; and
   a detection step comprising detecting an oscillatory failure as soon as at least two of said three distances are greater than said second detection threshold value for a second predetermined duration.

7. The method as claimed in claim 6, wherein said second position value relating to the position of the control surface, is defined from one of the following values:
   a control surface position measured directly by a control surface position measurement sensor;
   an estimated control surface position.

8. The method as claimed in claim 6, wherein the distance computation step comprises computing a Euclidean distance and in weighting this Euclidean distance by a correction factor.

9. The method as claimed in claim 1, wherein it comprises a step of setting a detection threshold.

10. The method as claimed in claim 1, wherein the position value and the control order are represented by signals, and further comprising a first preprocessing step comprising implementing a recentering of the signals by adjusting the signals to a nil average.

11. The method as claimed in claim 1, further comprising a second preprocessing step comprising implementing a compensation of a drag error.

12. A device for automatically detecting at least one oscillatory failure in at least one automatic position control chain of at least one control surface of an aircraft, said automatic control chain forming part of a system of electrical flight controls of the aircraft and comprising:
   said control surface which is mobile, and the position of which relative to the aircraft is set by at least one actuator;
   said actuator which sets the position of said control surface, according to at least one actuation order received;
   at least one sensor which measures a position value representative of the actual position of said control surface;
   a computer which generates a control order using a computation element, which receives said measured position value and which deduces therefrom an actuation order which is transmitted to said actuator;
   a first data processing unit configured to determine a first trend of the control order as a function of time, the control order being supplied by the computation element, said first trend being defined according to a reference parameter;

a second data processing unit configured to determine at least one second trend of the position value as a function of time, said second trend being also defined according to said reference parameter; and a monitoring unit configured to compare said first and second trends in order to verify the existence of a correlation between these first and second trends so as to detect an oscillatory failure as soon as a loss of correlation between said first and second trends appears, if necessary.

13. A system of electrical flight controls of an aircraft, said system comprising at least one means for generating control data for at least one control surface of the aircraft and at least one automatic position control chain of this control surface, which comprises:

said control surface which is mobile, and the position of which relative to the aircraft is set by at least one actuator;

said actuator which sets the position of said control surface, according to at least one actuation order received;

at least one sensor which measures a position value representative of the actual position of said control surface; and a computer which receives said control data, which receives said actual position and which deduces therefrom an actuation order which is transmitted to said actuator, at least one device for detecting at least one oscillatory failure in said automatic control chain, comprising:

said control surface which is mobile, and the position of which relative to the aircraft is set by at least one actuator;

said actuator which sets the position of said control surface, according to at least one actuation order received;

at least one sensor which measures a position value representative of the actual position of said control surface;

a computer which generates a control order using a computation element, which receives said measured position value and which deduces therefrom an actuation order which is transmitted to said actuator;

a first data processing unit configured to determine a first trend of the control order as a function of time, the control order being supplied by the computation element, said first trend being defined according to a reference parameter;

a second data processing unit configured to determine at least one second trend of the position value as a function of time, said second trend being also defined according to said reference parameter; and a monitoring unit configured to compare said first and second trends in order to verify the existence of a correlation between these first and second trends so as to detect an oscillatory failure as soon as a loss of correlation between said first and second trends appears, if necessary.

14. The system according to claim 13, wherein the system is located in an aircraft.

15. The device according to claim 12, wherein the device is located in an aircraft.

* * * * *